(12) United States Patent
Glass et al.

(10) Patent No.: US 7,277,671 B2
(45) Date of Patent: Oct. 2, 2007

(54) WIRELESS RESPONSE SYSTEM AND METHOD

(75) Inventors: Michael S. Glass, Conklin, MI (US); Harry G. Derks, Holland, MI (US)

(73) Assignee: Fleetwood Group, Inc., Holland, MI (US)

( * ) Notice: Subject to any disclaimer, the term of this patent is extended or adjusted under 35 U.S.C. 154(b) by 488 days.

(21) Appl. No.: 10/248,583

(22) Filed: Jan. 30, 2003

(65) Prior Publication Data

US 2003/0153263 A1 Aug. 14, 2003

Related U.S. Application Data

(60) Provisional application No. 60/356,979, filed on Feb. 14, 2002.

(51) Int. Cl.
*H04H 9/00* (2006.01)
*G09B 3/00* (2006.01)

(52) U.S. Cl. .................. 455/2.01; 455/2.01; 725/10; 725/13; 434/350; 434/351; 434/352; 700/91

(58) Field of Classification Search .............. 455/89, 455/186.1, 2.01, 517; 379/357; 434/332, 434/322, 350–352, 118, 428, 334–336, 362; 370/261, 276, 413; 364/411; 348/13; 340/10.41; 725/9, 13, 6, 10, 16; 463/9, 39, 40, 37; 700/91–92
See application file for complete search history.

(56) References Cited

U.S. PATENT DOCUMENTS

| 3,525,811 | A | | 8/1970 | Trice et al. .................. 704/272 |
|---|---|---|---|---|
| 4,829,558 | A | * | 5/1989 | Welsh ...................... 379/92.04 |
| 4,943,963 | A | * | 7/1990 | Waechter et al. ........... 370/428 |
| 5,226,177 | A | * | 7/1993 | Nickerson .................... 725/24 |
| 5,404,580 | A | | 4/1995 | Simpson et al. ............ 455/558 |
| RE35,449 | E | | 2/1997 | Derks .......................... 395/800 |
| 5,684,526 | A | * | 11/1997 | Yoshinobu .................. 725/131 |
| 5,842,871 | A | * | 12/1998 | Cutler et al. ................ 434/335 |
| 6,021,119 | A | | 2/2000 | Derks et al. ................ 370/261 |

(Continued)

FOREIGN PATENT DOCUMENTS

EP 0556853 8/1993

(Continued)

OTHER PUBLICATIONS

European Search Report for corresponding European Application No. EP 03394015.

(Continued)

*Primary Examiner*—George Eng
*Assistant Examiner*—Nam Huynh
(74) *Attorney, Agent, or Firm*—Van Dyke, Gardner, Linn & Burkhart, LLP (57) ABSTRACT

A wireless response system includes a base unit and a plurality of handheld response units communicating with the base unit over a wireless communication link. The base unit sends polling commands to the response units over the wireless communication. The response units send the response data to the base unit over the wireless communication link in response to the polling signals. The response data is entered in the respective response units by a user.

9 Claims, 10 Drawing Sheets

U.S. PATENT DOCUMENTS

| | | | |
|---|---|---|---|
| 7,076,434 B1 * | 7/2006 | Newnam et al. | 705/1 |
| 2002/0016196 A1 * | 2/2002 | Orak | 463/9 |
| 2004/0033478 A1 | 2/2004 | Knowles et al. | |

FOREIGN PATENT DOCUMENTS

| | | | |
|---|---|---|---|
| WO | 0153922 | | 7/2001 |
| WO | WO 01/53922 | * | 7/2001 |

OTHER PUBLICATIONS

Commonly assigned co-pending U.S. Appl. No. 10/248,814, filed Feb. 21, 2003, entitled Wireless Asynchronous Response System.

Commonly assigned co-pending U.S. Appl. No. 10/107,693, filed Mar. 27, 2002, entitled Wireless Audio and Data Interactive System and Method.

Commonly assigned co-pending U.S. Appl. No. 10/248,588, filed Jan. 30, 2003, entitled Wireless Response System and Method.

Commonly assigned co-pending U.S. Appl. No. 10/248,578, filed Jan. 30, 2003, entitled Wireless Response System With Feature Module.

Commonly assigned co-pending U.S. Appl. No. 09/192,256, filed Nov. 13, 1998, entitled Remote Site Interactive System.

* cited by examiner

WIRELESS RESPONSE SYSTEM AND METHOD

CROSS REFERENCE TO RELATED APPLICATIONS

This application claims priority from U.S. provisional patent application Ser. No. 60/356,979, filed on Feb. 14, 2002, the disclosure of which is hereby incorporated herein by reference in its entirety.

BACKGROUND OF THE INVENTION

The present invention is directed to remote response systems for retrieving user responses at a base unit and, in particular, to a wireless response system which utilizes wireless communication between response units and one or more base units.

Wireless response systems are desirable because they may be utilized at various locations without requiring wiring between the individual response units and the base unit. This makes wireless response systems especially attractive for their portability and ability to be used in various venues. While applications for response systems vary, it is known to utilize systems to monitor the progress of students during a lesson, monitoring the reaction of individuals to the presentation of a commercial advertisement to or a debate, or the like.

Wireless response systems require that data be exchanged between the response units and the base unit over a wireless communication channel or channels. Therefore, any data exchange is limited by the bandwidth, or data transmission capability, of the wireless communication link(s). This becomes especially important as the number of response units increases. Moreover, variations in physical structures of the venue in which the response system is located can affect the ability of response units in certain areas of the venue to reliably communicate with the base unit.

SUMMARY OF INVENTION

A wireless response system and method, according to the invention, includes providing a base unit and a plurality of handheld response units and communicating between the response units and the base unit over a wireless communication link. Polling commands are sent from the base unit to the response units over the wireless communication link. Response data is entered in the respective response units by a user, and the response data is sent from the response units to the base unit over the wireless communication link in response to one of the polling signals. The wireless communication link may be an RF link, an IR link, or a combination of both.

According to an aspect of the invention, a time of response is determined for at least some of the response data. The time of response is a time that the corresponding response data was entered by a user. The time of response is determined at least from time data that is obtained at the base unit and time data that is obtained at the corresponding one of the response units. A first timer may be provided at the base unit and a second timer at each of the response units. The time data may be obtained at the base unit with the first timer and the time data obtained at the corresponding one of the response units with the second timer. The time data obtained at the base unit includes a value of the first timer when the base unit sends a respective one of the polling signals. The time data obtained at the corresponding one of the response units includes a value of the respective one of the second timers and includes initiating a respective one of the second timers upon response data being entered in the respective response unit by a user.

The respective value of the timed data obtained at the corresponding one of the response units may be sent with the response data. The base unit may calculate the time of response from data obtained at the base unit and time data obtained at the corresponding one of the response units. The time of response may be used to determine the respective times that the users entered response data with the response unit.

According to another aspect of the invention, a resolution timer is provided at the response units. Frequency of response data being collected by that response unit is limited by the resolution timer. The response units may collect response data once per time interval established by the resolution timer. The response units may collect response data that is a synthesis of response data entered in the respective response unit by the user during the time interval. A value of the time interval may be selectable, such as by command sent by the base unit over the wireless communication link.

A time of response that the corresponding response data was entered by a user may be determined for at least some of the response data. The time of response may be determined from time data obtained at the base unit and time data obtained at the corresponding one of the response units. Buffers may be provided at the response unit. The response data may be collected with the buffers and retrieved from the buffers over the wireless communication link.

These and other objects, advantages and features of this invention will become apparent upon review of the following specification in conjunction with the drawings.

DESCRIPTION OF THE PREFERRED EMBODIMENTS

Figure 1:
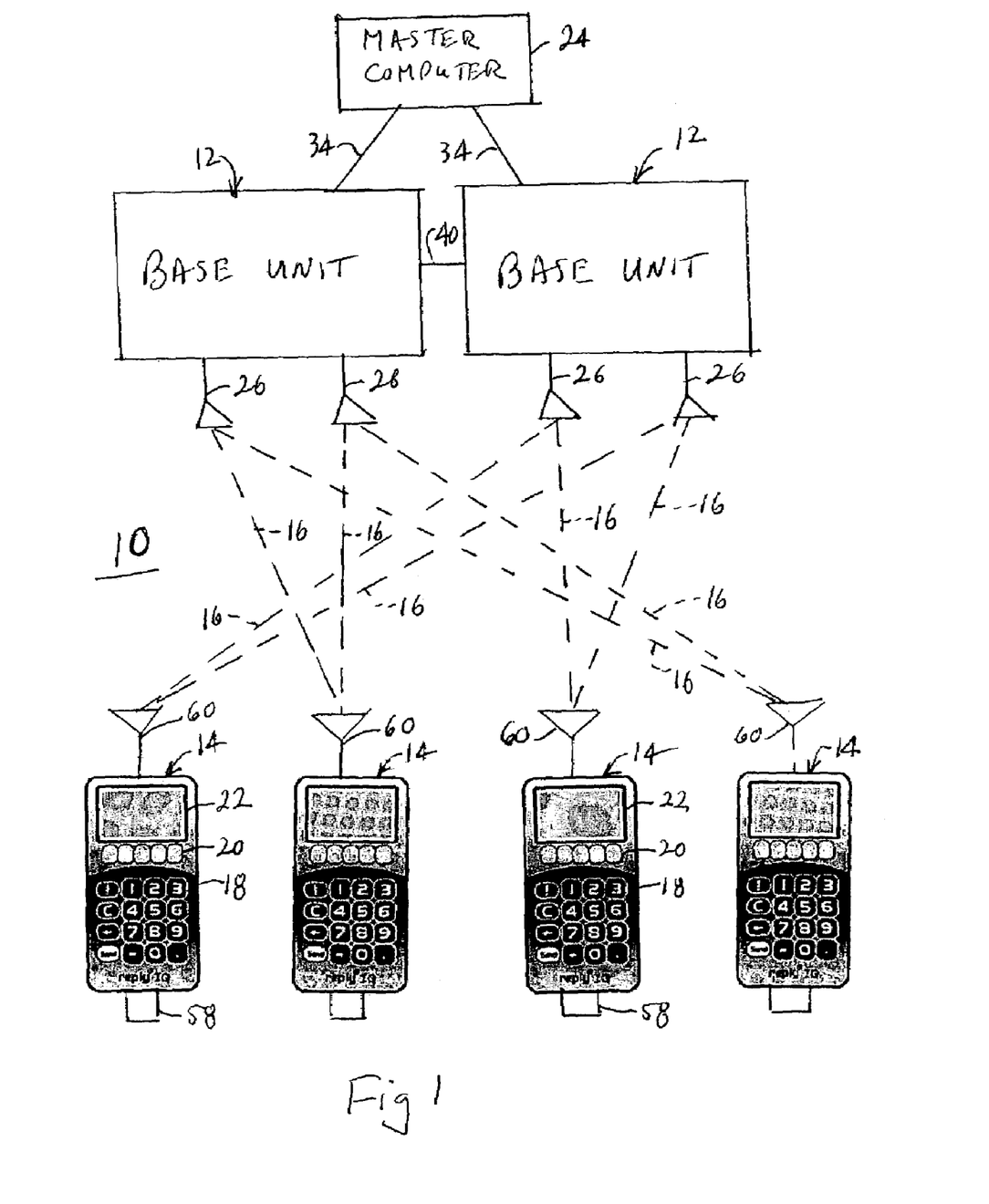
FIG. 1 is a block diagram of a wireless response system, according to the invention.

Referring now specifically to the drawings, and the illustrative embodiments depicted therein, a wireless response system 10 includes one or more base units 12 and a plurality of response units, or keypads, or handheld units, 14 which communicate with the base unit(s) over one or more wireless communication links 16. The base units send polling signals, also known as base packets or base transmission, to the response units over wireless communication links 16, and the response units send response data, also known as response packets or keypad transmission, to the base unit over the wireless communication link(s) in response to the polling signals. The response data is entered in the respective response unit 14 by a user. An illustration of a protocol of the communication between base unit 12 and response units 14 is generally as disclosed in detail in commonly assigned U.S. Pat. No. Re. 35,449 for a REMOTE 2-WAY TRANSMISSION AUDIENCE POLLING AND RESPONSE SYSTEM; U.S. Pat. No. 5,724,357 for a REMOTE RESPONSE SYSTEM AND DATA TRANSFER PROTOCOL; and U.S. Pat. No. 6,021,119 for a MULTIPLE SITE INTERACTIVE RESPONSE SYSTEM, the disclosures of which are hereby incorporated herein by reference.

Figure 3:
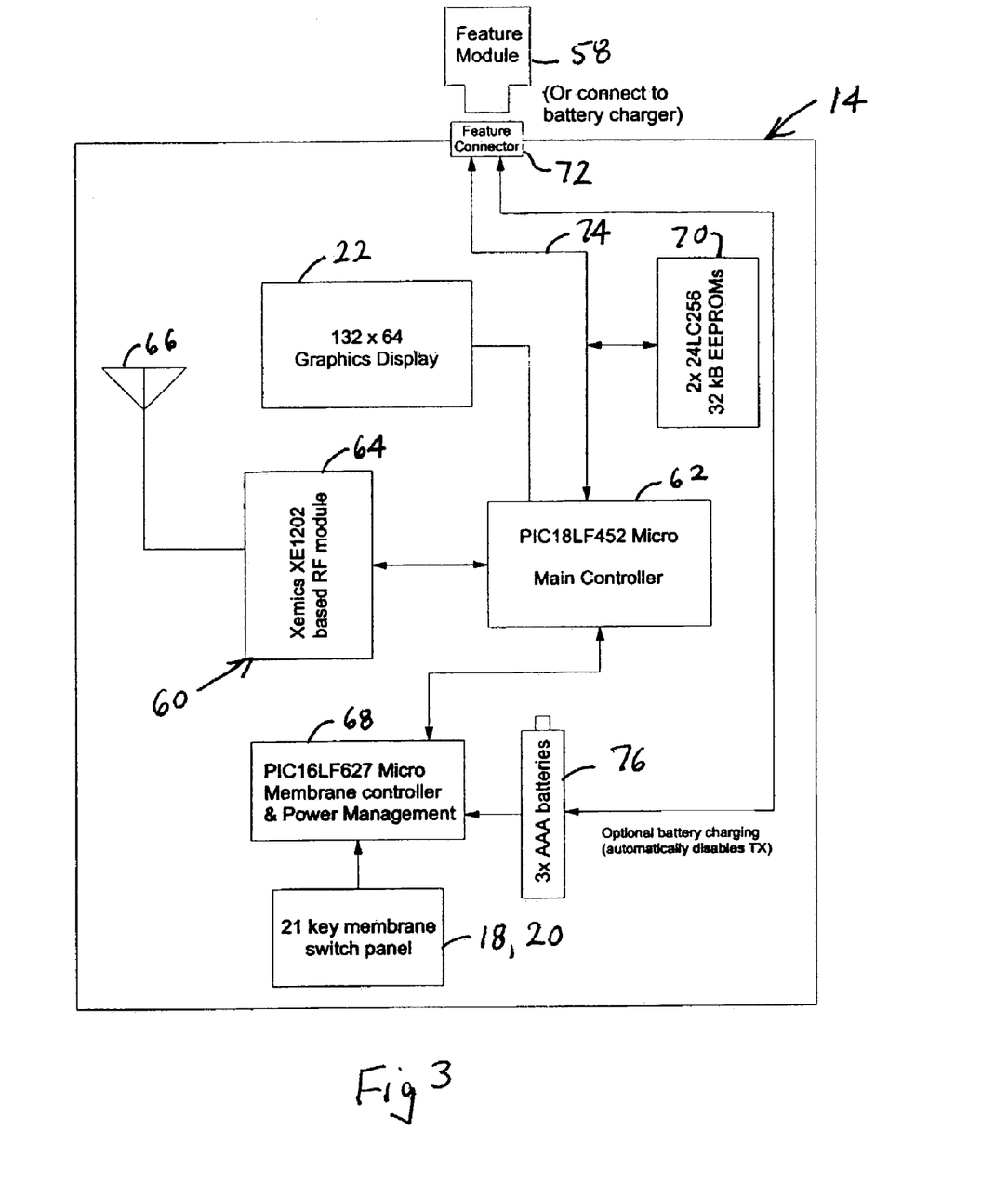
FIG. 3 is an electrical block diagram of a response unit.

Each response unit 14 may include user input devices, such as a hardware keypad 18, a series of soft keys 20, or the like. Other input devices may be utilized, such as handwriting recognition pads, joysticks, or the like. Each response unit 14 may additionally include a display 22 for displaying information to the user as well as indicating user selections. Base unit 12 may be connected with a command computer 24 in order to provide top level control of wireless response system 10, as well as to run software applications to analyze data produced by wireless response system 10. Such application software is known in the art and has been developed for various commercially available response systems including Applicant's REPLY® response system. They may include programs which produce data synchronized with an event to illustrate user responses, and which may be broken down by categories of users during each interval of the event. Other examples include various data-charting applications, statistical analysis applications, and the like.

Figure 2:
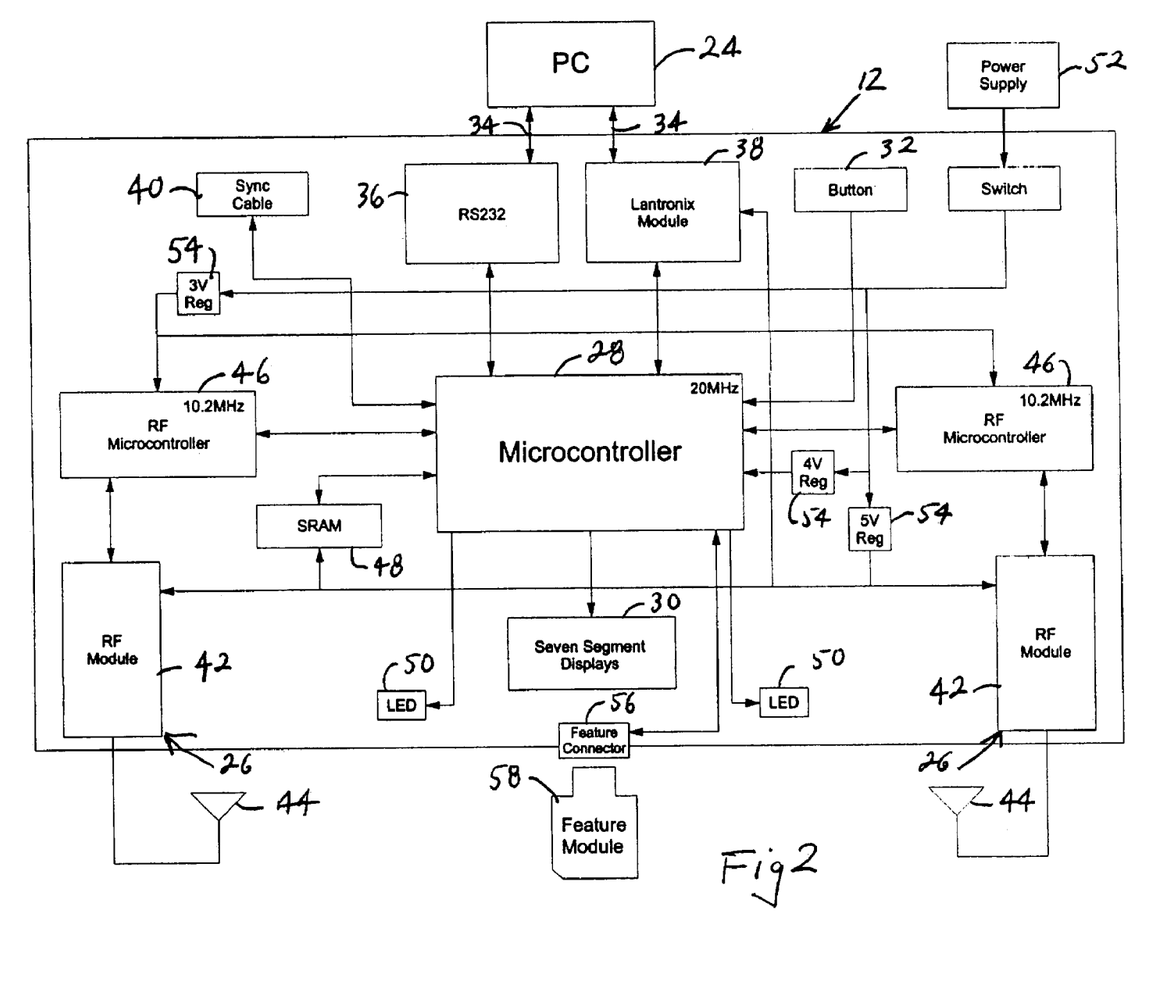
FIG. 2 is an electrical block diagram of a base unit.

In the illustrative embodiment, two base units 12 are illustrated, each with a pair of transceivers 26. However, it should be understood that for certain applications, only one base unit 12 may be utilized and base unit 12 may utilize only one transceiver 26. Furthermore, certain elements illustrated with respect to the base unit may, likewise, be omitted for particular applications. Base unit 12 includes a microcontroller 28, which drives a display 30. Microcomputer 28 receives inputs from a control button, or switch, 32. Microcontroller 28 includes communication capability with computer 24 over one or more control lines 34. The button is used in startup procedures to change the base channels (1-15) or the type of control line 34 used. In the illustrative embodiment, microcomputer 28 is capable of communication with computer 24 over a control line 34 defined by either a serial interface circuitry 36, a network connection, such as Ethernet interface 38, or the like. Interface 38 converts the UART signal from the microcontroller to TCP/IP protocol, while the RS232 circuitry 36 converts the UART signal to serial communication standards.

When multiple base units 12 are active on different channels, these bases may be connected to each other via the sync cable which, in the illustrative embodiment, is a coaxial cable. One base unit is designated as the master base and all others are slaves. The master base unit sends out pulses that tell the slave bases when to send their data to the response units on their appropriate channel. This function is disabled when only one base unit is active. As will be explained in more detail below, the function performed by sync cable 40 may also be performed by computer 24 through control lines 34.

In the illustrative embodiment, the microcontroller determines what information from master computer 24 goes to the response units and what information stays with the base unit. When information for a response unit is received, the base unit reconfigures the data into a format that the response unit will understand and ships it to the response unit. The microcontroller also puts the data it receives from the response units into an SRAM 48 and keeps it there until the system user requests the data. The microcontroller maintains all of the bitmaps that the master computer can request (Acknowledged Bitmap, Active Bitmap, and Low-Battery Bitmap). The microcontroller controls the timing of when the RF signal is sent to the response units and when the response units are to respond. In a multiple base system, it also controls the timing of each base RF signal so they do not interfere with each other.

Each transceiver 26 includes a transceiver module 42, antenna 44 and a dedicated microcontroller 46. Microcontroller 46 is the liaison between the main microcontroller 28 and the RF modules. They pass the information from the main microcontroller to the response units (via the RF module) and from the response units to the main microcontroller. The main function of these micros is to throw away errant data. They receive all of the data from the response units and check it for any errors before sending the information to the main microcontroller. It should be understood that the function performed by dedicated microcontroller 46 might alternatively be performed by microcontroller 28. Transceiver module 42 is the actual link between the base and the response units. The function of this module is to send data to and receive data from the response units. They convert the RF signal into UART format and pass the information to the RF microcontroller or convert the UART message from the RF microcontroller into an RF signal to send to the response units. Base unit 12 additionally includes primary memory 48 and one or more indicators 50. Additionally, base unit 12 includes a power supply 52 and various voltage regulators 54. As will be explained in more detail below, base unit 12 may include a feature connector 56 and a removable feature memory module 58, which is removably connected with connector 56. Microcomputer 28 communicates with feature connector 56 by serial communication, such as an $I^2$ C line, which provides data and clock to the feature module 58.

In the illustrative embodiment, response unit 14 includes a transceiver 60 and a main controller 62. This is the main processor for the response unit. It controls everything on the board except the membrane switches. Transceiver 60 includes an electronic module 64 and an antenna 66. Module 64 is controlled by controller 62. Module 64 is a half duplex module that either transmits or receives wireless data. Data is cleaned up by a bit synchronizer, which provides pattern recognition as well as clocked UART data. Display 22 is also controlled by main controller 62. Main controller 62 receives inputs from keypad 18 and soft keys 20 by way of a membrane controller 68. Membrane controller 68 controls the membrane switches and the main power to the rest of the response unit. When a control line is set, this processor completely turns power off to everything except itself.

Main controller 62 exchanges data with a primary memory 70. Primary memory 70 in the illustrative embodiment is made up of two 32 KB EEPROMs on each response unit. The first EEPROM is used to store icons and canned messages used by the response unit. This is not user accessible. The second EEPROM gives 32 KB of space for the user to store customized graphics, messages, questions, and the like. These functions could be combined in a common memory module. A feature connector 72, is in communication with main controller 62 such as by way of a serial line 74 which, in the illustrative embodiment, is an $I^2$ C line. Power is supplied to feature connector 72 from a battery source 76, which also supplies power to the remaining components of the response unit. The response unit may include a built-in battery charging circuit. Feature connector 72 is configured to removably receive feature memory module 58 and to supply clock power, and the like, for proper operation of the feature memory module.

In the illustrative embodiment, transceivers 26 and 60 are radio frequency (RF) modules, which are capable of operating on multiple different frequency bands, or channels. However, the transceivers may, in certain applications, be single-channel transceivers, or may be other than RF transceivers, such as infrared (IR) transceivers, or the like.

The feature memory module provides an extension of the functionality of the response unit. It includes electronic memory which can be written to or read by main controller 62. Feature module 58 may include code which is permanently stored on the memory module and/or code which is temporarily stored thereon for customizing the particular response unit. The latter type of code may be supplied by a standalone system or, in the illustrative embodiment, may be supplied by base unit 12 which, in turn, receives the data from or supplies the data to master computer 24.

In one application, feature module 58 may be a security device which must be attached to a response unit in order for that response unit to operate. This provides a security feature which makes it difficult to copy software from the base unit for illegal uses. More particularly, in such configuration, if feature module 58 is not connected with feature connector 72, the main controller 62 will disable operation of the corresponding response unit.

Feature module 58 may also be used to preload data for supplying to a particular response unit. This may include, by way of example, identifying information of the user to which that response unit is assigned. This may include the name, identification number, such as social security number, for that user, and characteristics of the user, such as age, gender, and the like. This avoids the necessity of such data being transmitted over communication link 16 or to be entered at the keypad by the user.

Feature memory module 58 may also be utilized to provide custom icons and prompts which may be displayed by main controller 62 at graphic display 22. Once again, this allows such customized information to be provided to the response unit without the necessity of transmitting the information over communication link 16. Additionally, feature memory module 58 may be utilized to upgrade the software stored in primary memory 70 for use by main controller 62.

In addition to the applications previously set forth, feature memory module 58 may be utilized to receive certain data entered by the user in the corresponding response units. In this manner, when the feature memory module is read by the base unit, or other such reading device, data from the user may be transferred to the base unit without needing to pass through communication link 16. This is especially useful for certain information, such as identifying information, which may be inserted by the user and which may be of significant size. Other uses for feature memory module 58 may suggest themselves to the skilled artisan.

In the illustrative embodiment, response unit 14 includes a housing 76 (FIGS. 9-12). Housing 76 may include an opening (not shown) for receiving a connector 78 of feature memory module 58. Feature memory module 58 also includes a housing 80. Housing 80 may be selectively juxtaposed with or removed from housing 76. When juxtaposed with housing 76, a security device 82 may be provided that inhibits removal of feature memory module 58 from the response unit. In this illustrative embodiment, security device 82 is accomplished by an arm 84 extending from housing 80. Housing 76 of response unit 14 includes an external feature 88, which is grasped by arm 84 when connector 78 is engaged with feature connector 72. Arm 84 is flexible but which can be constrained by way of a security screw 86 passing through arm 84 and engaging housing 80. With security screw 86 in place, arm 84 is retained in a locked position with respect to housing 80. Thus, with security screw 86 in place, the arm 84 should not be sufficiently deflected to readily separate housing 80 from housing 76. Security screw 86 may be of a configuration to avoid easy removal from housing 80. Examples include Allen head, torq head, as well as Phillips head, slot head, and other configurations, as would be apparent to the skilled artisan.

Figure 9:
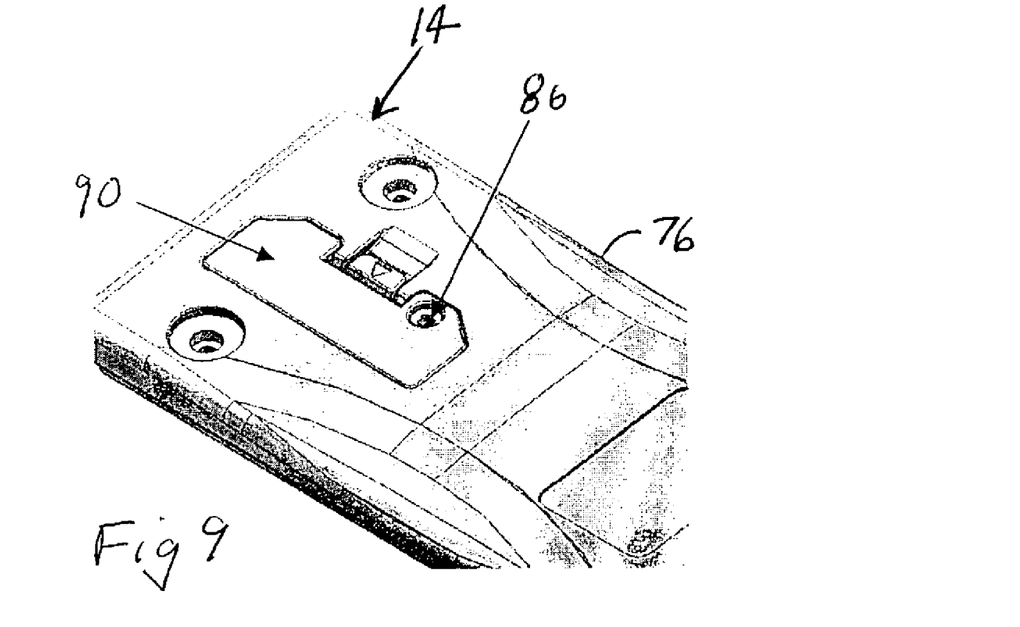
FIG. 9 is a perspective view of a response unit housing illustrating a battery compartment cover.
Figure 10:
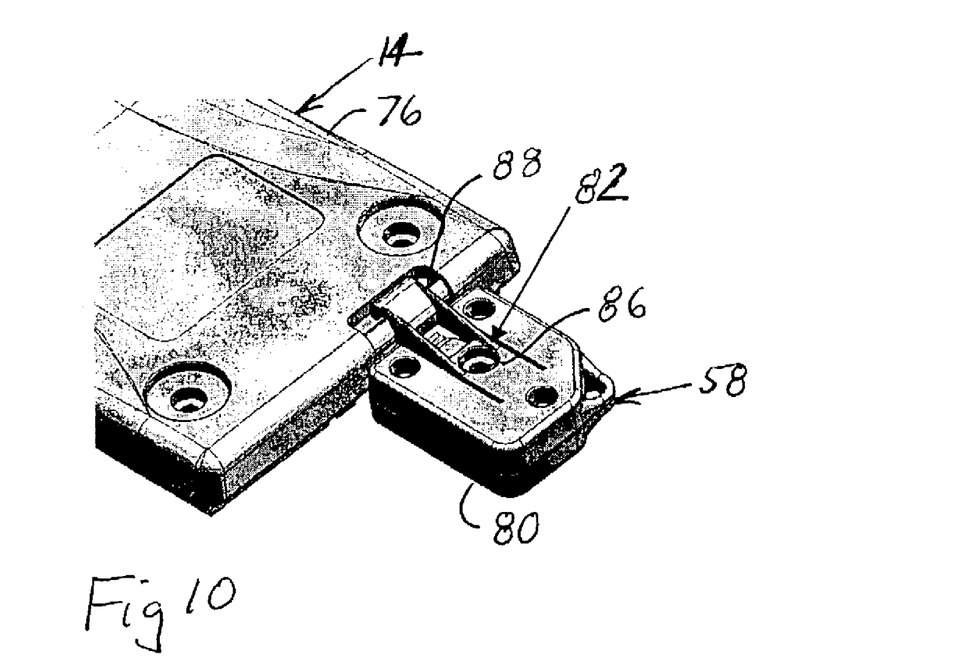
FIG. 10 is a perspective view of a response unit housing in FIG. 8 illustrating a feature memory module.
Figure 11:
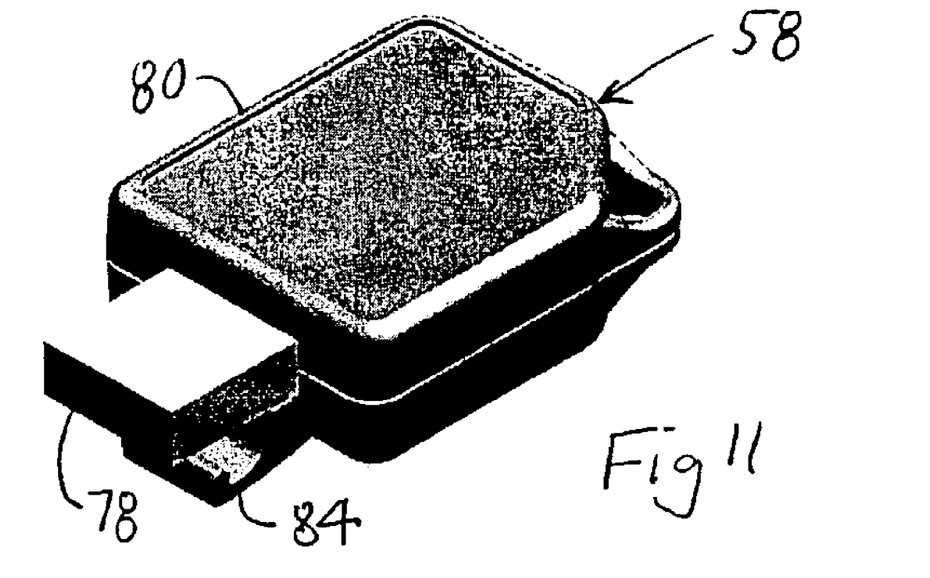
FIG. 11 is a perspective view of a feature memory module.
Figure 12:
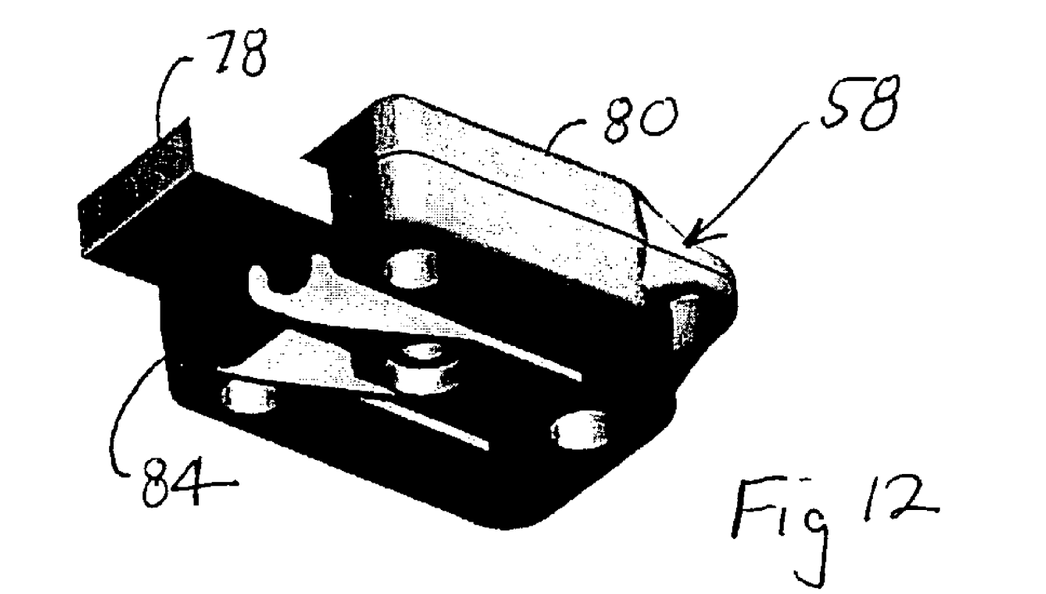
FIG. 12 is a different perspective view of the memory module in FIG. 10.

In the illustrative embodiment, battery 76 is retained within a battery chamber of housing 76 by a battery lid 90. Battery lid 90 may be retained by a security screw 86 in order to discourage the removal of battery 76 from the response unit. This is especially advantageous if common battery configurations are used for battery 76, thereby making them more attractive for theft.

In the illustrative embodiment, base unit 12 includes two or more transceivers 26 (FIG. 1). The transceivers are physically spaced apart and send polling signals that are spaced apart in time. The purpose of this configuration is to fill in dead spots in the venue in which the system is located. A dead spot is a location of response unit and/or base unit where a wireless communication link is inoperative. In particular, both location diversity and time diversity are provided by transceiver 12. This diversity allows transceivers 26 to have substantially the same power of transmission as transceiver 60. This reduces the necessity for regulatory approval without sacrificing range and reception.

In order to allow a particular response unit to determine which base transmission it has received, an identity bit may be inserted in the base transmission dependent upon which transceiver 26 transmitted the packet that was received by the respective response unit. This identity bit allows the response unit to determine a proper time in which to send its response packet, because the base transmissions are time-staggered.

In the illustrative embodiment, system 10 includes two or more base units 12. The multiple base units are synchronized in order to send polling signals concurrent, or sequentially timed, with each other. The provision of multiple base units enhances the number of response units that can be utilized with a system because the various base units may be operated in different frequency bands. Each base unit, in the illustrative embodiment, may be operated over one of 16 separate frequency channels. Thereby, each base unit is set to a unique channel from the other base units and the response unit in communication with each base unit is set to the channel for which the base unit is set. The sending of polling signals concurrently with each other avoids the situation where one base unit may be sending polling signals while one or more other base units are attempting to receive response data from the response units. Although tuned to different frequency bands, the effect of a base transmission on another base unit attempting to receive a response packet would be to tend to saturate the receiving apparatus of the receiving base unit.

In order to provide such synchronized polling, the base units are apprised of when another base unit is polling. In the illustrative embodiment, this is accomplished by sync connection 40. In addition to such direct hard-wire connection between the base units, the base units may be synchronized by a common command from computer 24, such as over control line 34.

A startup sequence 100 is performed by base unit (FIG. 4) initiated by powering on of the unit (102). The presently selected communication link, or channel, is displayed (104, 106, 108, 110). A timer is started at 112, and it is determined at 114 whether the timer has expired. If so, the then-current channel is displayed (116, 118, 120), the settings are locked at 122 and normal operation of the base unit commences at 124.

Figure 4:
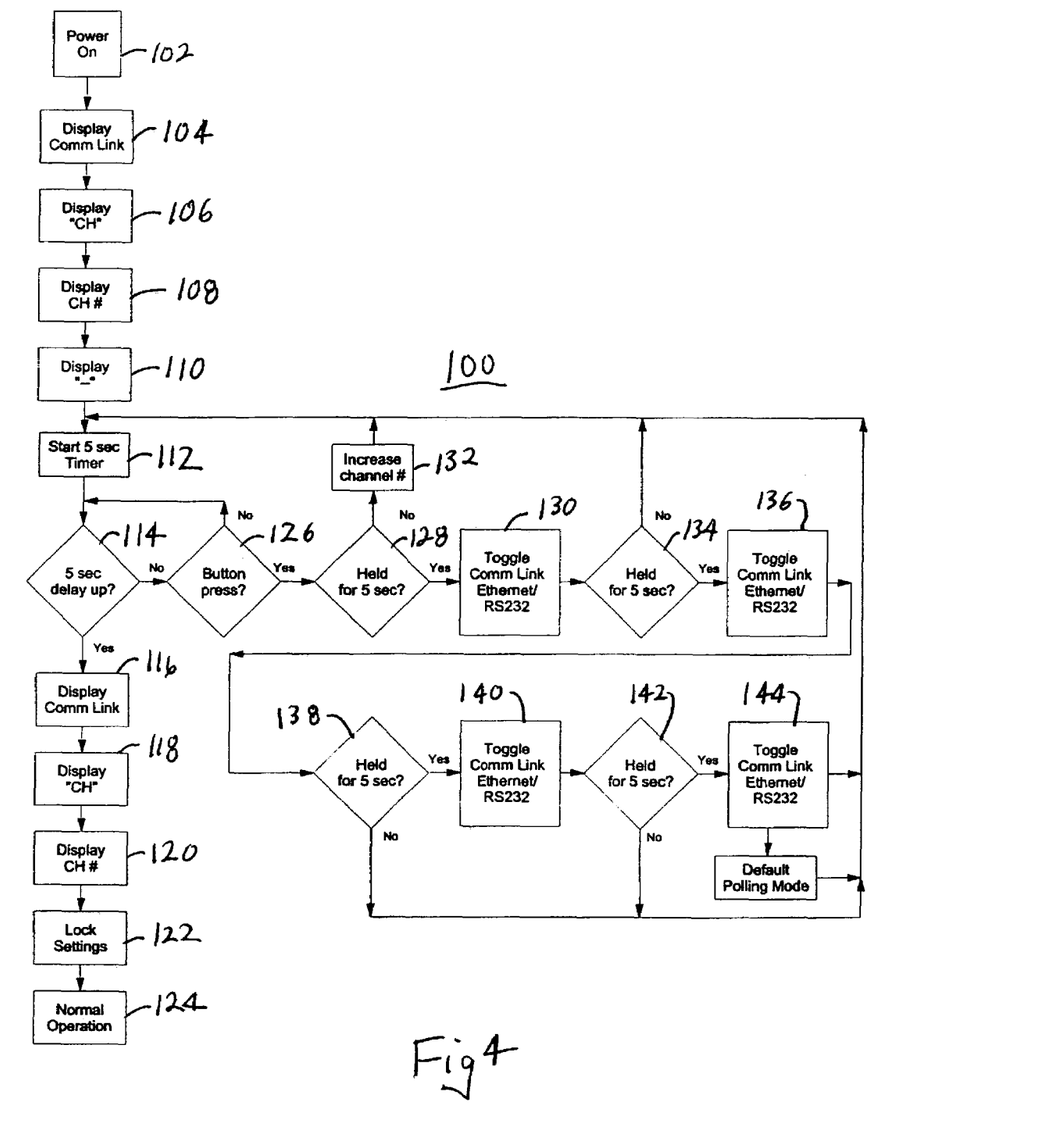
FIG. 4 is a flowchart of a base unit startup program.

If, during the running of the timer, button 32 is pressed (126) and held for a predetermined period of time (128), the control line is toggled at 130. The control line is toggled between a serial link as established by module 36 and a network link as established by module 38. If the button is not held for five seconds, the control increases the channel number at 132. If the button continues to be held, the control continues to toggle the communication link (134, 136, 138, 140, 142, 144) until it is released. This scheme provides a convenience manner to set up the base unit with utilizing an individual switch, or button, 32.

Figure 5:
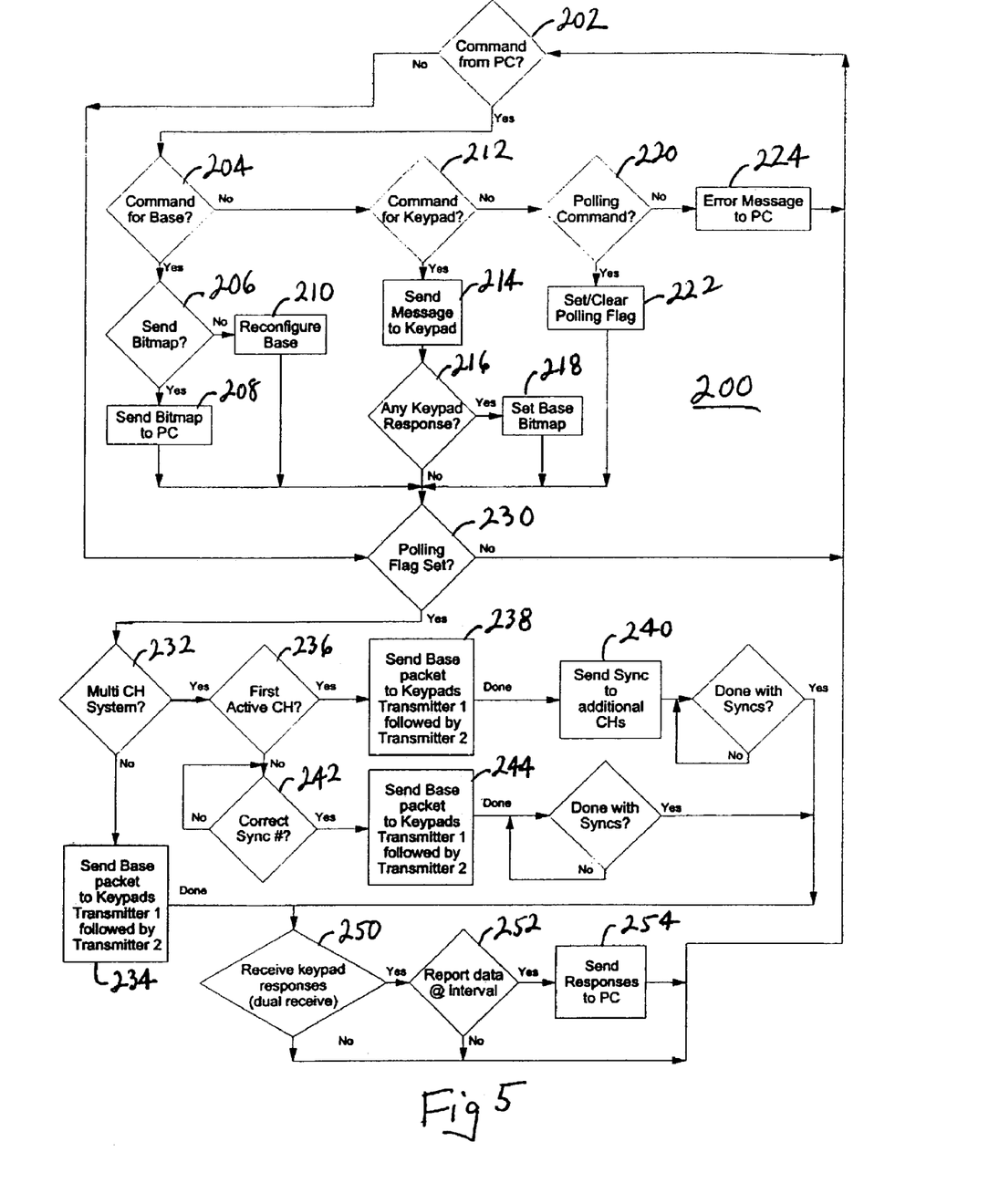
FIG. 5 is a flowchart of a base unit operation program.

A normal operation program 200 for the base unit begins at 202 by examining whether a command has been received from master computer 24 (FIG. 5). If a command has been received, it is determined at 204 whether the command is for the base unit and, if so, it is determined at 206 whether the computer is requesting a bitmap from the base unit. If so, the bitmap is sent at 208. If it is determined at 206 that the computer is not requesting a bitmap, it is concluded that the compute is attempting to reconfigure the base unit, which is carried out at 210. If it is determined at 204 that the computer is not sending a command for the base unit, it is determined at 212 whether the computer is intending to send a command to the response units 214. If so, a message is configured for the response units at 214. A determination is made at 216 whether a response is received from the response unit and, if so, the base unit bitmap is modified at 218.

If it is determined at 212 that the master computer is not providing a command for the response units, it is determined at 220 whether the master computer 24 is attempting to configure the polling sequence for the base unit. If so, a polling flag is set or cleared at 222. If the command from the master computer is not for the base, or for a keypad or is a polling command, it is determined at 224 that an error has occurred and an error message should be sent to the master computer.

If it is determined at 202 that the base unit is not receiving a command from master computer 24, a determination is made at 230 whether the polling flag has been set. If so, a determination is made at 232 whether response system 10 is a multi-channel system. If it is not, the individual base unit sends a base-polling packet at 234 first to one of the transceivers 26 and, subsequently, in time to the second transceiver 26. The second transceiver may transmit immediately following the first transceiver or by some determined amount of time.

If it is determined at 232 that multiple base units 12 are utilized, one of the base units, designated a master, is allowed to send a polling command at 236 which is sent at 238 first by one transceiver 26 followed by a subsequent transceiver 26. A sync command is sent at 240 to additional base units.

If it is determined at 236 that the particular base unit is not the master base unit, it is determined at 242 if a sync command has been received. When the sync command is received, the base packet and polling command for that base unit is transmitted at 242 first by one transceiver and then the other transceiver.

After the polling commands are sent, it is determined at 250 whether a keypad response has been received. When a response has been received, it is determined at 252 whether the response is to be time-stamped, as will be described in more detail below, and the responses are forwarded to master computer 24 at 254.

Figure 6:
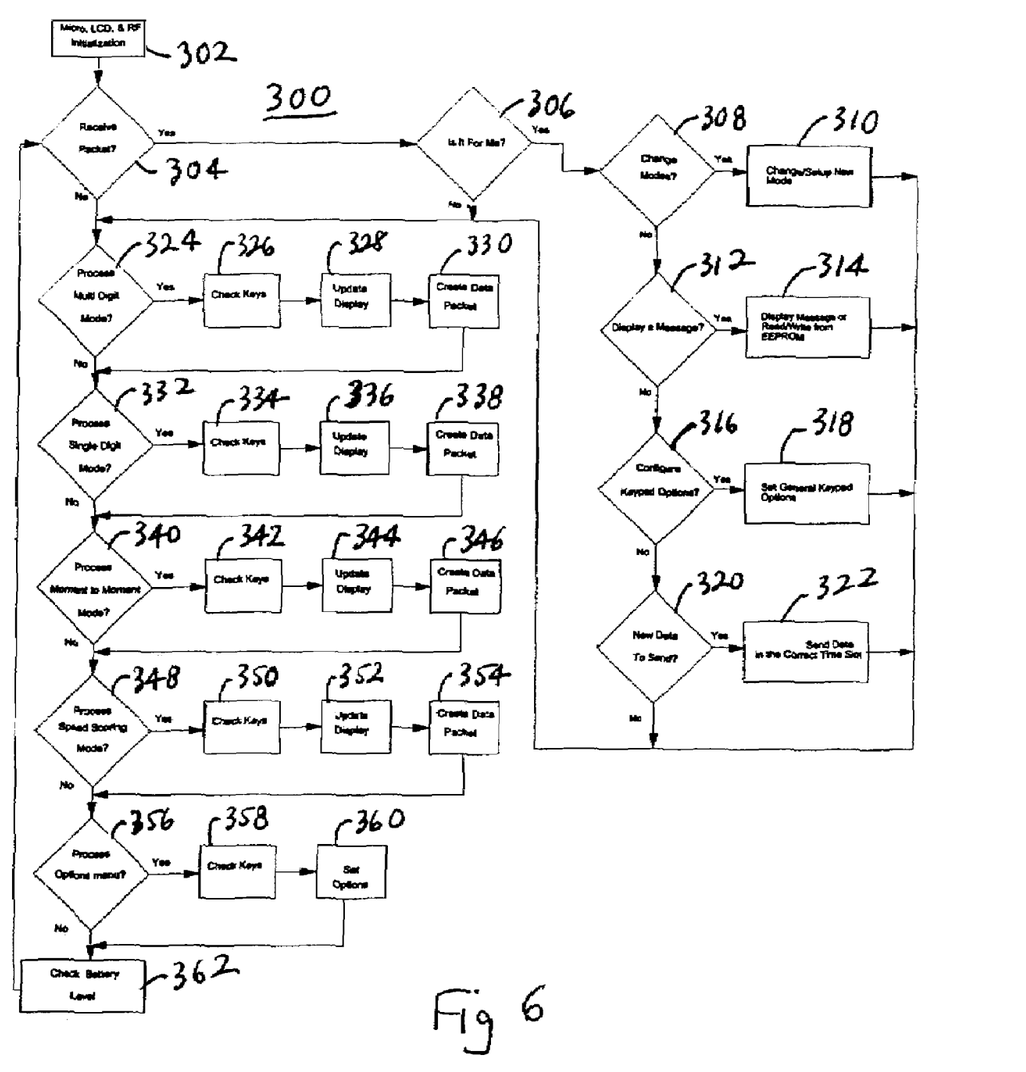
FIG. 6 is a block diagram of a response unit program.

Operation of a response unit is carried out by a response unit control program 300 (FIG. 6). Program 300 begins at 302 by initialization and then determines at 304 whether a polling command, or base packet, has been received. If so, it is determined at 306 whether the packet is intended for the particular response unit. In particular, it may determine whether the base packet includes the group identity for that response unit. If the base packet is intended for that unit, it is then determined at 308 whether the base packet indicates that a change of modes is intended. This occurs when a byte in the base packet identifies that a mode is to be set to, for example, "single digit," "multi-digit," "speed-scoring" or "moment-to-moment" modes. In the moment-to-moment mode, the base packet would also include a resolution value. It should be understood that these modes are illustrative only. If it is determined at 308 that a mode change is to occur, the new mode is set at 310.

If it is determined at 308 that the base packet does not indicate a change of modes, it is determined at 312 whether the base packet includes a command to display a message. If so, the message is read from memory 70 of the base unit, feature memory module 58 or the base packet itself and is displayed. If it is determined at 312 that the base packet does not command to display a message, it is determined at 316 whether the base packet commands to configure a keypad option. A keypad option may include, by way of example, a change of address for that response unit, a timeout signal, or the like. If it is determined that a keypad option is to be configured, the keypad option is set at 318. If it is determined at 316 that the base packet does not intend to configure a keypad option, it is determined at 320 whether the base packet is requesting that new data be sent from that response unit. If so, data is sent for that response unit at 322, such as in a response data packet, or the like. If time division multiplexing is utilized, the response data packet is sent in the correct timeslot for that response unit. Other response schemes may be utilized.

If it is determined at 304 that a base packet, or polling command, has not been received, it is determined at 324 whether the response unit is in a multi-digit mode. In the multiple-digit mode, the user can send a response of a number of characters, such as up to 16 characters. When the base is polling, data is sent from the response unit every time a new key is pressed. In the illustrative embodiment, if the "send" key is pressed when fewer than the maximum number of characters have been entered, the display will get blanked out and all further key presses will be locked out except for certain function keys. When the base unit confirms that it has received the data, the entry will be cleared and data entry will begin again. In such mode, the unit captures entry of characters in strings and updates the display accordingly. If in this mode, the unit responds to key entries at 326, updates the display at 328, and creates a data packet at 330 with the multiple-digit entry. Creation of such a data packet is disclosed in detail in the U.S. Pat. No. 5,724,357 patent and will not be repeated herein. Other examples of data packet creation may suggest themselves to the skilled artisan.

If it is determined at 324 that the unit is not in a multi-digit mode, it is determined at 332 whether the unit is in a single-digit mode. In this mode, only one key press can be sent at a time. A key press will be displayed in the center of the screen. The key shown on the screen will be sent to the base unit during the next polling interval. When the number clears from the screen, the base unit has successfully received the data. If so, the unit examines for key presses at 334, updates the display at 336, and creates a response data packet at 338.

If it is determined at 332 that the unit is not in a single-digit mode, it is determined at 340 whether the unit is in a moment-to-moment mode. The moment-to-moment mode allows the user to record their opinion to a certain event as that event occurs. A detailed description of the moment-to-moment mode will be set forth in more detail below. If it is determined at 340 that the unit is in a moment-to-moment mode, key presses are received at 342, the display is updated at 344, and a response data packet is created at 346.

If it is determined at 340 that the unit is not in a moment-to-moment mode, it is determined at 348 whether the unit is in a speed-scoring mode. The speed-scoring mode operates similar to the multi-digit mode with the exception of a time-stamped response. The group being polled will attempt to answer a question at the same time. Based on the time-stamped responses from each keypad, it is possible to determine which keypad was first pressed down. If it is determined at 348 that the unit is in a speed-scoring mode, the control checks for key presses at 350, updates the display at 352, and creates a response data packet at 354.

If it is determined at 348 that the unit is not in a speed-scoring mode, it is determined at 356 if the unit is to process an options, or configuration, menu. Each response unit may include a configuration menu, which can be accessed by the pressing of certain keys in combinations that would not normally be pressed. When this occurs, the display displays a series of options. These may include placing the unit in a single-digit mode, multi-digit mode, speed-scoring mode, moment-to-moment mode, or the like. Another option is to set the address of the response unit. Another selection allows the channel number of the wireless communication channel to be raised or lowered. Another selection allows the response unit to be powered down. If it is determined at 356 that the unit is in the process options mode, key presses are received at 358 and the appropriate options are set at 360. A check is made of the unit battery at 360 and the unit returns to step 304.

As previously set forth, the moment-to-moment mode allows the user to record their opinion of a certain event in the form of "very bad," "bad," "indifferent," "good," "excellent," or similar such grading. In this mode, "---0 +++" appears on the display just above soft keys 20. The user is instructed to press a key that corresponds to the desired opinion, and the display will be highlighted above the soft key to indicate that a key press has happened. Information on when the key was pressed and what value was entered gets stored in a buffer and is sent to the base unit on the next polling interval. The response unit is able to store up to a number of different key presses. Whenever a polling command is received, the buffer is at least partially emptied up to a given number of characters that are designated to be retrieved at each polling command. Because opinion key presses can be entered quickly, the moment-to-moment mode provides a technique for preventing the buffer from filling up completely thereby missing subsequent key presses.

The moment-to-moment mode is accomplished by establishing a resolution, which may be sent from the base unit. If multiple key presses are received during the resolution time, the key press presses are combined-into one value. This may be accomplished by saving only the latest value in a particular resolution time or by performing an averaging function. Thus, by way of example, the unit may take only the last one of the resolution times and discard the rest. In the illustrative embodiment, a resolution time may be set at intervals, such as ¼ second, ½ second, or the like. As an example, if 128 different key presses can be stored in the buffer and the resolution time is set to ½ second, up to 64 seconds of key-presses can be stored in the buffer. Other resolution values may be utilized. Each key press entry stored in the buffer may be accompanied by a time stamp for when that entry was made. In the illustrative embodiment, the time stamp is accurate to a 50-millisecond tolerance, but other accuracies may be utilized. The benefit of the moment-to-moment mode is that it preserves the integrity of the system while providing the time stamp of the key presses for a particular time interval. Under most circumstances, the user should not be entering more than one key press per resolution time. However, if more than one key press is entered, a composite of the key presses or the last key press will be stored, along with the time stamp for that key press. The base unit retrieves characters from the buffer at a rate consistent with the bandwidth of the wireless communication channel while the user is placing entries in the buffer. The use of the moment-to-moment mode ensures that the buffer will not overflow by resisting entries being stored in the buffer significantly faster than the base unit can clear them out.

In the speed-scoring mode 400, each response is time-stamped. The group being polled will attempt to answer a question at the same time. Based on the time-stamped responses from each response unit, it is possible to determine which keypad was pressed down first within a given tolerance, such as 50 milliseconds, or the like. Speed scoring is set up by the base unit. Unlike the multi-digit mode, the maximum number of characters is selectable from one to a maximum number of characters, such as 16. There is also an option of whether to record the time stamp on either the last key pressed or the time stamped on the "send" key only.

Figure 7:
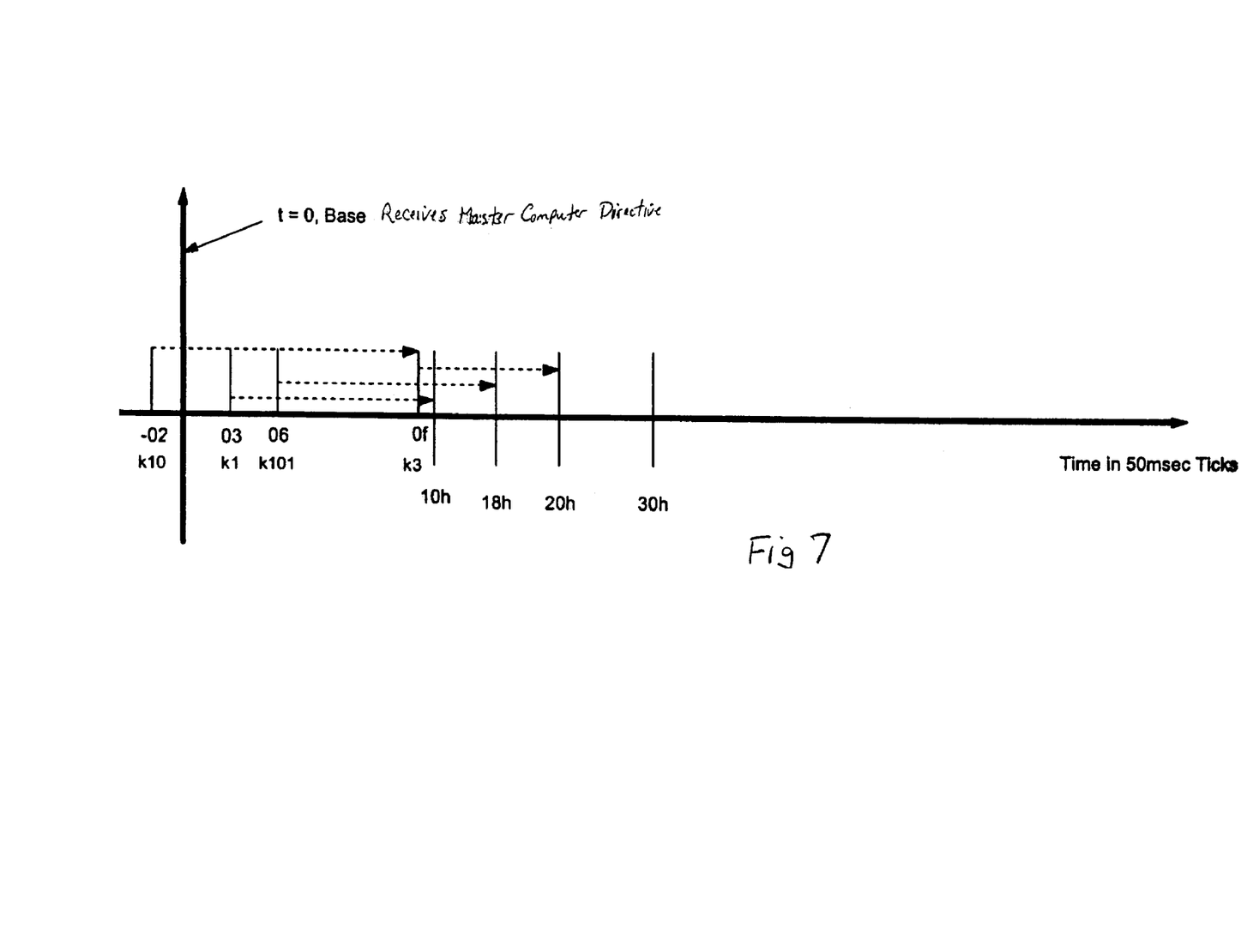
FIG. 7 is a diagram illustrating a time-stamp function.
Figure 8:
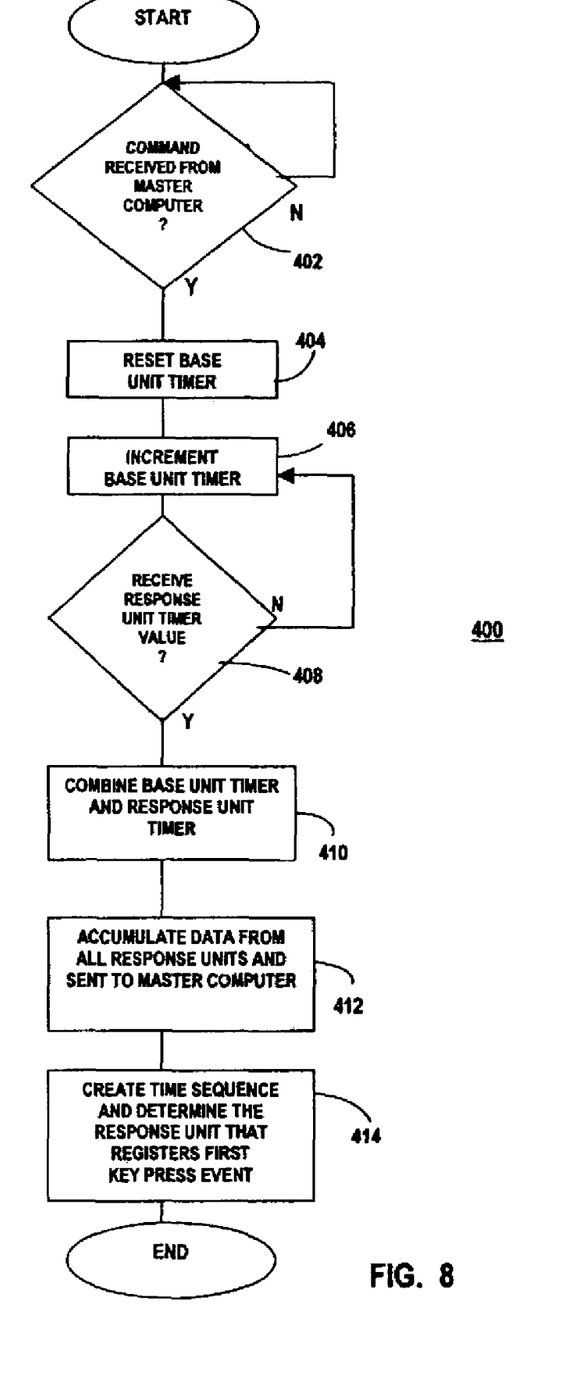
FIG. 8 is a flowchart of a time-stamp function.

The speed-scoring mode 400 is illustrated in FIGS. 7 and 8. Master computer 24 initiates a speed-scoring period by sending a command to the base unit. This is illustrated as T=0 in FIG. 7. The base unit resets a counter at 404 upon receipt of the command and begins incrementing the counter (406). In the meanwhile, the response units are responding to the pressing of a key by initiating a counter in the response unit, which counts up after a key is pressed. The response data packet retrieved by the base unit includes a value of this counter at the time that the base packet is processed by the response unit (408). When a data packet is received, the key press timer value is combined with the value of the base unit timer when that polling command was issued in order to provide a time stamp for the response (410). The base station accumulates the data from all of the response units and sends the data to the master computer (412). The master computer recreates the timing sequence and determines what response unit registered the first key press event (414).

Unlike prior art techniques for time stamping which require a synchronizing signal being sent to reset the key press counters for all of the response units, the time stamp function in the present invention is independent of receipt of a synchronizing command from the base unit. Instead, the timers are initiated by the key press in the response units, not by a signal received from the base unit. The advantage of this is that, should a response unit be placed into service, it can immediately begin obtaining a time stamp for the key presses therefrom. The time stamp can be retrieved at a subsequent polling command that is sent after the key press has occurred.

In the embodiment illustrated in FIG. 7, response unit K1 presses a key at T=03 and starts a timer at 03 relative to the base unit timer. Response unit K1 is polled and returns data at 10 h. Response unit time data is 10 h minus 03 h which equals 0 dh. The base unit timer value equals 100 dh. The time stamp for K1 is 10 minus 0 d which equals 03. Keypad K101 presses a key at T=06 and starts its timer at 06 h relative to the base unit timer. Response unit K101 is polled and returns data at 18 h. The response unit timer data is 12 h. The base unit timer value equals 1812 h which transforms to 18 h minus 12 h which equals 06 h. Keypad K3 presses a key at 0 fh and starts its timer at 0 fh relative to the base unit timer. The response unit is polled and returns data at 20 h because it missed the 10 h polling interval. The response unit timer is 11 h. The base timer value is 2011 h which transforms to 20 h minus 11 h which equals 0 fh. Keypad K10 presses a key at T=−02 h and starts the timer at−02 h relative to the base unit timer. The response unit is polled and returns data at 10 h. The response unit timer data is 12 h. The base unit timer value equals 1012 h which transforms to 10 h minus 12 h. This is a negative value and, therefore, disregarded because it occurred before the start command from the master computer and is, therefore, invalid.

As previously set forth, the time stamp function is useful in the speed-scoring mode, the moment-to-moment mode, as well as other potential modes.

Changes and modifications in the specifically described embodiments can be carried out without departing from the principles of the invention which is intended to be limited only by the scope of the appended claims, as interpreted according to the principles of patent law including the doctrine of equivalents.

The invention claimed is:

1. A wireless response system, comprising:
    a base unit and a plurality of handheld response units, said base unit having a wireless base transceiver, each said response unit having a wireless response transceiver, said wireless base transceiver communicating with each said wireless response transceiver over a wireless communication link, each of said response units comprising a plurality of keys for entry of actual user responses and a key press timer, said base unit comprising a base unit timer;
    said response units sending transmissions to said base unit over said wireless communication link, said transmissions including actual user responses and a value of said key press timer, the actual user responses being entered in the respective response unit by a user operating one of said keys;
    wherein said base unit determines a derived time of response for at least some of said response units and compares the derived times of responses for said at least some of said response units with each other to establish an order in which actual user responses were entered for said at least some of said response units; and
    the derived time of response being determined for a response unit at said base unit at least from the value of said key press timer that is received by said base unit from that response unit and from a value of said base unit timer when a transmission is received from that response unit, the value of said key press timer being obtained at the corresponding one of said response units and sent to said base unit, the value of said key press timer being a difference between time that a response is entered at that response unit and time that the corresponding transmission is sent to said base unit, wherein the derived time of response is a function of the time of entry of an actual user response.

2. The response system of claim 1 wherein said wireless communication link comprises at least one chosen from an RF link and IR link.

3. The response system of claim 1 wherein said base unit sends a polling signal to said response units and said response units send user responses to said base unit in response to the polling signal.

4. A wireless response system, comprising:
    a base unit and a plurality of handheld response units, said base unit having a wireless base transceiver, each said response unit having a wireless response transceiver, said wireless base transceiver communicating with each said wireless response transceiver over a wireless communication link, each of said response units comprising a plurality of keys for entry of actual user responses and a key press tuner, said base unit comprising a base unit timer;
    said response units sending transmissions to said base unit over said wireless communication link, said transmissions including actual user responses and values of said key press timers;
    wherein derived times of response are determined for at least some of said response units and compared with each other to establish an order in which actual user responses were entered at the corresponding said response units;
    wherein said base unit sends polling signals to said response units and wherein said response units send the transmission to said base unit in response to one of said polling signals and wherein the value of said key press timer transmitted from a response unit comprises time difference between an actual user response and receipt of one of said polling signals by that response unit, and wherein the derived time of response for that response unit is a function of the value of said key press timer transmitted from that response unit and a value of said base unit timer when the said base unit sends one of said polling signals.

5. The response system of claim 4 wherein said wireless communication link comprises at least one chosen from an RF link and IR link.

6. A wireless method of retrieving response data from a plurality of users, comprising:
    providing a base unit and a plurality of handlield response units, said base unit having a wireless base transceiver, each of said response units having a wireless response transceiver;
    communicating between each said wireless response transceiver and said wireless base transceiver over a wireless communication link, including providing a plurality of keys at each of said response units for entry of actual user responses, providing at each of said response units a key press timer and providing a base unit timer at said base unit;
    entering an actual user response in the respective response unit by a user operating one of said keys;

sending actual user responses and values of said key press timers from said response units in a transmissions to said base unit over said wireless communication link; and determining a derived time of response for a response unit at said base unit from a value of said key press timer that is received by said base unit from that response unit and from a value of said base unit timer when the transmission is received from that response unit; and comparing the derived times of response for at least some of said user responses to establish an order in which responses were entered for said at least some of said response units, wherein the value of said key press timer being a difference between time a user response is entered at that response unit and time the corresponding value of said key press timer is sent to said base unit.

7. The method of claim 6 including said base unit sending polling signals to said response units and said response units sending the response data to said base unit in response to one of said polling signals and wherein the value of said base unit timer comprises a value of said base unit timer when said base unit sends a respective one of said polling signals.

8. The method of claim 6 wherein said wireless communication link comprises at least one chosen from an RF link and an IR link.

9. The method of claim 6 including sending a polling signal from said base unit to said response units and sending user responses from said response units to said base unit in response to one of the polling signal.

* * * * *

UNITED STATES PATENT AND TRADEMARK OFFICE
CERTIFICATE OF CORRECTION

PATENT NO. : 7,277,671 B2
APPLICATION NO. : 10/248583
DATED : October 2, 2007
INVENTOR(S) : Michael S. Glass and Harry G. Derks It is certified that error appears in the above-identified patent and that said Letters Patent is hereby corrected as shown below:

Column 1:
Line 5, "APPLICATIONS" should be --APPLICATION--.
Line 40, insert --THE-- before "INVENTION".

Column 2:
Line 57, "EMBODIMENTS" should be --EMBODIMENT--.

Column 4:
Lines 38 and 65, "I2 C" should be --I2C--.

Column 9:
Line 52, "---0 +++" should be ---- - 0 + ++--.

Column 10:
Line 5, "combined-into" should be --combined into--.
Line 13, "key-presses" should be --key presses--.

Column 12:
Line 23, "tuner" should be --timer--.
Line 51, "handlield" should be --handheld--.

Signed and Sealed this

First Day of July, 2008

JON W. DUDAS
*Director of the United States Patent and Trademark Office*